(No Model.)

W. P. BLEDSOE.
COTTON PLANTER.

No. 391,225. Patented Oct. 16, 1888.

WITNESSES.
F. L. Ouraud
R. M. Elliott

INVENTOR.
William P. Bledsoe,
by J. Louis Bagger & Co.
Attorneys.

N. PETERS, Photo-Lithographer, Washington, D.C.

UNITED STATES PATENT OFFICE.

WILLIAM P. BLEDSOE, OF CARLOCK, ASSIGNOR OF ONE-HALF TO JOHN B. CORBET, OF COG HILL, TENNESSEE.

COTTON-PLANTER.

SPECIFICATION forming part of Letters Patent No. 391,225, dated October 16, 1888.

Application filed June 23, 1888. Serial No. 277,964. (No model.)

*To all whom it may concern:*

Be it known that I, WILLIAM P. BLEDSOE, a citizen of the United States, and a resident of Carlock, in the county of McMinn and State of Tennessee, have invented certain new and useful Improvements in Cotton-Planters; and I do hereby declare that the following is a full, clear, and exact description of the invention, which will enable others skilled in the art to which it appertains to make and use the same.

This invention relates to combined planters and fertilizer-distributers.

The object is to produce a device which will act as a planter, opening the furrow, dropping the fertilizer, planting the seed, and then turning in the furrow on the seed, and all without complication of parts and with comparatively light draft for operating the same.

With these objects in view the invention consists in the combination, with the frame of a planting and distributing device, of a movable frame pivoted thereto and carrying a cylinder or drum for containing the cotton or other seed to be planted; furthermore, in the combination, with the frame of the device provided with a hopper for containing fertilizer to be sown, of a stirrer moving in the bottom of the said hopper and reciprocated by means of a lever connecting with a crank on the shaft of the stirrer and with a crank on the shaft of the seed-cylinder, whereby when the cylinder is revolved by passing over the ground the stirrer will be operated to prevent the fertilizer from becoming clogged in the discharge-spout; and, finally, the invention consists in the various novel details of construction, as will be hereinafter fully set forth.

Figure 1:
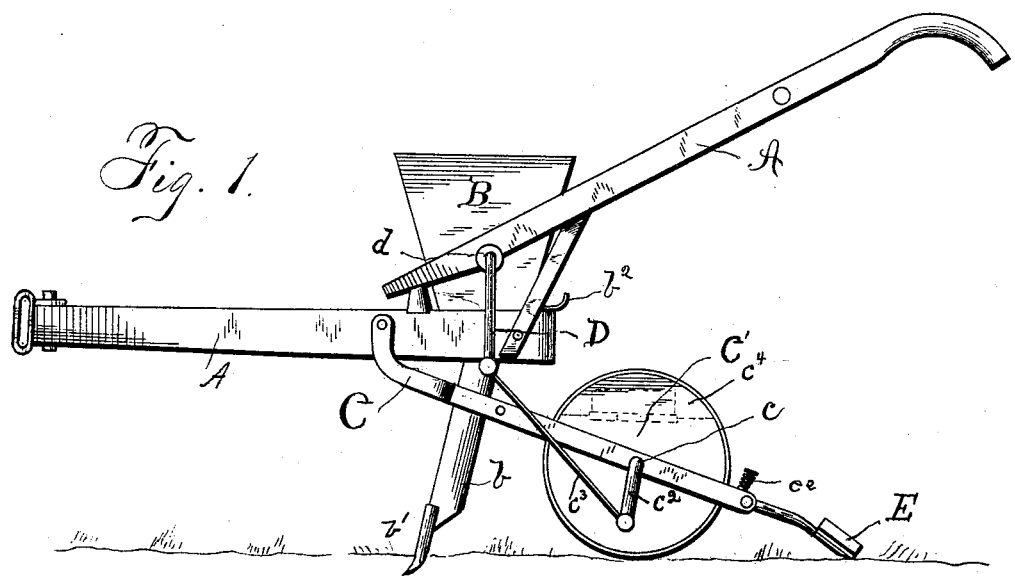
Figure 2:
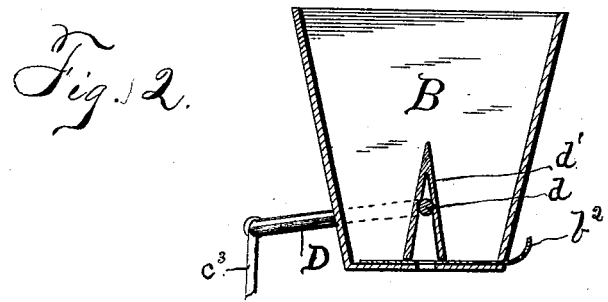
Figure 3:
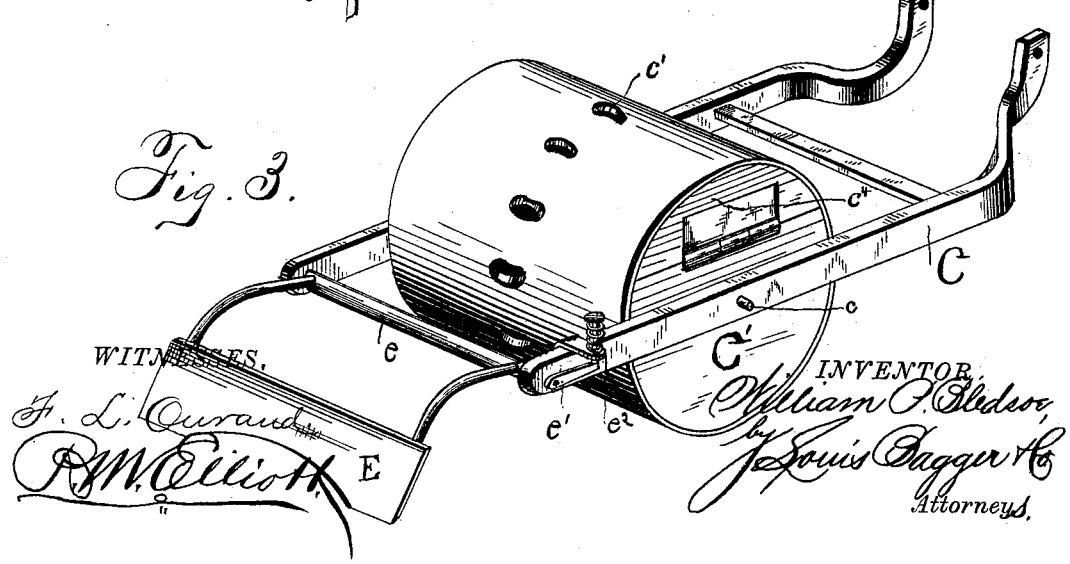

In the accompanying drawings, forming part of this specification, and in which like letters of reference indicate corresponding parts, Figure 1 is a side elevation of the planter and distributer, showing the seed-cylinder, the lever connecting with a crank on the seed-cylinder to the shaft of the stirring device, the discharge-spout below the hopper, and the spring-actuated coverer for turning in the furrow after the seed have been dropped. Fig. 2 is a vertical sectional view of the hopper detached, showing the stirrer therein; and Fig. 3 is a perspective view of the movable frame, showing the cylinder mounted therein, the openings through which the seed are dropped, and the door in the side of the cylinder for supplying it with seed, and the coiled spring for operating the coverer.

Referring to the drawings, A designates the frame of the device, which is of ordinary construction. At a point preferably near the end of the beam $a$ is mounted a hopper, B, underneath of which and extending through the bottom of the frame is a tube or discharge-spout, $b$, provided on its front side with a shovel, $b'$, designed to open the furrow when the device is in operation. Directly above this spout and working under the bottom of the hopper is a slide, $b^2$, provided with an opening, by means of which the amount of fertilizer to be dropped may be regulated by pushing it in or out.

C designates a movable frame, which is constructed preferably of iron, and is pivoted to the main frame at a point near the hopper. In this frame is mounted a shaft, $c$, to which is secured a seed drum or cylinder, $C'$, which is designed to contain the seed to be sown. In the side of this cylinder are formed a number of openings, $c'$, which are preferably at regular intervals, so that the seed may be dropped at substantially equal distance apart. One end of the shaft on which the cylinder is mounted is bent to form a crank, $c^2$, to which is secured a lever or connecting-rod, $c^3$, which is designed to engage a crank, D, and connect with the shaft $d$, on which the stirrer $d'$ is mounted.

To the outer end of the movable frame C is secured a coverer, E, which is designed to turn in the furrow after the seed have been dropped. To one or both ends of the shaft $e$, on which this coverer is mounted, is secured a crank, $e'$, to which is attached a coiled spring, $e^2$, designed to keep the coverer in position at all times, so that should it strike any obstacle and be lifted up it will immediately resume its position after having passed such an obstacle.

The mode of operation is as follows: The cylinder is first filled through a door, $c^4$, with any suitable seed and the hopper B with a suitable fertilizer, such as guano or other fertilizer. When the device is run over the ground, the cylinder will revolve and drop the seed at regular intervals from the openings $c'$ immediately on top of the thin layer of earth which has fallen on the fertilizer which has been dropped in front of it through the discharge-spout $b$, and the coverer immediately turns the furrow in and covers the seed. By pivotally securing the frame C on the main frame A and flexibly connecting the seed-roller with the stirrer the planter can pass over uneven or cloddy ground without becoming inoperative, as the seed-roller can be raised or lowered in relation to the main frame and still operate the stirrer, as the connection between the roller and the stirrer will accommodate itself to the different changes of position. Thus it will be seen that, although this device is exceedingly simple of construction, it will be efficient and durable in use, and may be constructed at a comparatively slight expense.

Having thus fully described my invention, what I claim as new, and desire to secure by Letters Patent, is—

In a cotton-planter, the combination, with the main frame provided with a fertilizer-box, of a stirrer within the box, a frame pivotally secured to the main frame and having a rotary seed-roller journaled therein, and a flexible connection between the roller and stirrer, substantially as set forth.

In testimony that I claim the foregoing as my own I have hereunto affixed my signature in presence of two witnesses.

WILLIAM P. BLEDSOE.

Witnesses:
 J. S. BASINGER,
 J. B. KING.